(No Model.) 2 Sheets—Sheet 1.

B. B. PRITCHETT.
COTTON SEED PLANTER.

No. 378,109. Patented Feb. 21, 1888.

Witnesses:
W. J. Graham
E. L. Richards

Inventor:
Basil B. Pritchett,
By Richards
Attorneys (No Model.) 2 Sheets—Sheet 2.

B. B. PRITCHETT.
COTTON SEED PLANTER.

No. 378,109. Patented Feb. 21, 1888.

Witnesses:
W. J. Graham.
E. L. Richards.

Inventor:
Basil B. Pritchett
By Richards & Co
Attorneys

UNITED STATES PATENT OFFICE.

BASIL B. PRITCHETT, OF CHRISMAN, ILLINOIS.

COTTON-SEED PLANTER.

SPECIFICATION forming part of Letters Patent No. 378,109, dated February 21, 1888.

Application filed January 11, 1886. Serial No. 188,153. (No model.)

*To all whom it may concern:*

Be it known that I, BASIL B. PRITCHETT, of Chrisman, in the county of Edgar and State of Illinois, have invented a new and useful Improvement in Cotton-Seed Planters; and I hereby declare the following to be a full and clear description thereof.

This invention relates to a machine for dropping or planting cotton-seed, and is designed to plant the cotton-seed in the form in which it comes from the gin, with a considerable portion of lint adhering to the seed, which prevents the seed running freely out of any planting-machine except such as makes especial provision for planting the unlinted seed.

This invention consists in constructing a machine adapted to planting this kind of unlinted seed by means of toothed feeders, which automatically feed out of the seed-hopper the seed and deposit it in a furrow made by the opener of the machine.

The invention will be readily understood by reference to the accompanying drawings, of which—

Figure 1:
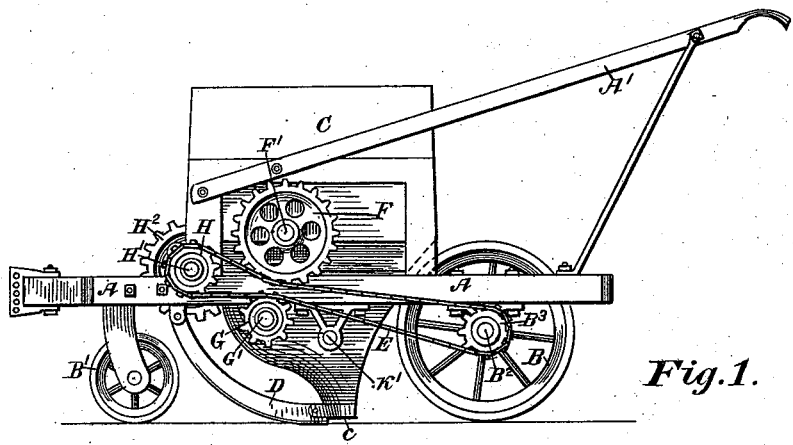
Figure 2:
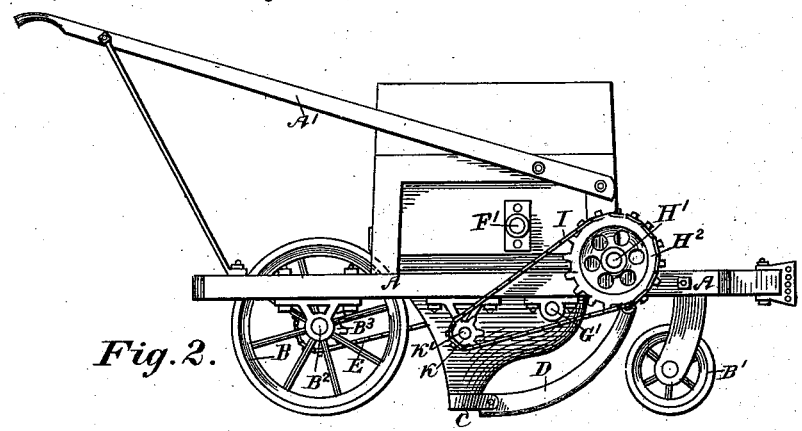
Figure 4:
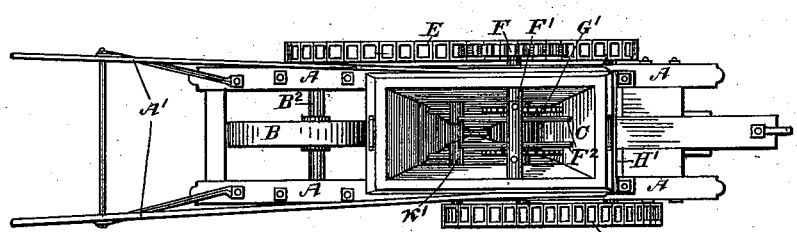
Figure 3:
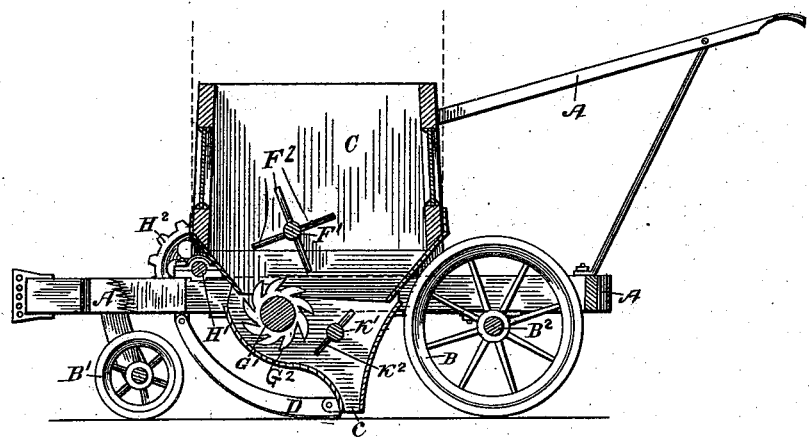
Figure 5:
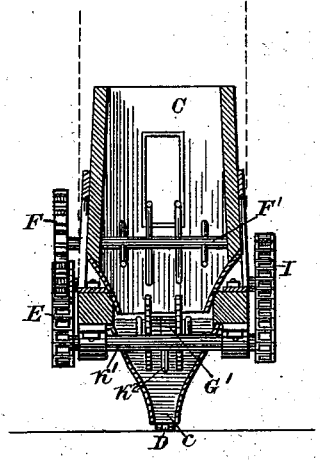

Figure 1 is a side elevation of one side of the machine, showing portions of the operative mechanism. Fig. 2 is a side elevation of the reverse side of the machine. Fig. 3 is a central longitudinal sectional elevation of it. Fig. 4 is a complete plan of the machine. Fig. 5 is a transverse sectional elevation through the center of the hopper and the seed-outlet.

The machine is built on a general supporting-frame, A, which is mounted on a driving-wheel, B, at its rear end, and carries a guiding-wheel, B', at its front end. A pair of guiding-handles, A', are attached to the rear part of the frame A, and these resemble in form and the method of using them a pair of ordinary plow-handles. At the front end of the machine the usual provision, by clevis or otherwise, is made for the attachment of the team. A seed-hopper, C, is mounted on the frame A, in about its central part, and the lower end of this terminates in a conically-shaped hopper-bottom, with an outlet at $c$ just in the rear of the lower end of the furrow-opener D, so that the seeds which are dropped out of the seed-outlet $c$ fall into the furrow made by the said opener, in which position the driving-wheel B, following immediately after, presses the seeds down into the ground, and so plants them. The opener D is a curved steel blade with its upper end attached to the bottom side of the beam A in front of the seed-hopper, and has its rear lower end attached to the extreme lower end of the hopper, near its outlet $c$.

The axle $B^2$ of the main or driving-wheel B extends outside of the frame A on one side of the machine, and carries on this overhanging end a sprocket-wheel, $B^3$, from which, through the medium of the linked or chain belt E, the other operative parts of the machine are driven. This belt E passes between the pinion sprocket-wheels F and G, with the peripheries of which wheels it contacts, so as to actuate them, and thence it passes on over and around the sprocket-wheel H on the counter-shaft H', the opposite end of which carries another sprocket-wheel, $H^2$, from which a belt, I, similar to the belt E, drives a smaller sprocket-wheel, K, on the outer end of the counter-shaft K'.

The shafts F', G', and K' are used to actuate feeding devices within the seed-hopper C. On the said shaft F', within the hopper C, there is mounted a set of radial arms or feeders, $F^2$. These arms are made quite long—as long, in fact, as the limits of the hopper in which they are inclosed will admit—and these revolving at quite a slow speed stir up and distribute the adhering linty seed, so as to permit or cause it to fall down upon the next set of feeders, $G^2$. These last-named feeders consist of a set of sharp-pointed toothed blades, somewhat like the saws of a cotton-gin, and they are rotated somewhat faster than the feeding-arms $F^2$, so that they grasp and pull the seeds off from the said revolving arms $F^2$. The lowermost set of the feeders are mounted on and rotated by the shaft K'. This lower set of feeders I call "knockers," for they knock the seeds off from the teeth of feeders $G^2$ and drop them out of the lower aperture, $c$, of the said feed-hopper. These knockers $K^2$ consist of radial arms, somewhat like the arms $F^2$, and they are mounted on and rotated by the shaft K', but at a considerably higher speed than either the feeders $F^2$ or $G^2$. A successive higher speed in each of the succeeding feeding devices below the first is an essential element in this machine, as it prevents the seed from clogging in the hopper or its outlet, and this arrangement also prevents the seed from adhering to the feeders.

The three prongs of the knocker K² (see Fig. 5) are so arranged on their shaft that one of them operates between the hooks or teeth of the feeder or dropper G², while the other two operate one on each side of the outside of said teeth, thereby the more effectually removing the seed from the teeth of said dropper.

Having thus described my invention, what I claim as new, and desire to secure by Letters Patent, is—

1. In a cotton-seed planter, a hopper provided in its upper compartment with an agitator comprising radial arms, a feeder or dropper comprising sharp-pointed saw-like blades or hooks located between the upper and lower compartments, and a radially-armed knocker located in the lower compartment and in close proximity to the feeder or dropper, in combination with gearing arranged so that the agitator, feeder, and knocker are rotated at different rates of speed, the speed accelerating from the first to the last mentioned device, substantially as and for the purpose set forth.

2. A hopper provided with an agitator in its upper compartment, in combination with a feeder or dropper located between the upper and lower compartments and having two rows of saw-like blades or hooks, and a knocker located in the lower compartment in close proximity to the feeder or dropper and having three radial arms, one of which operates between the blades of said feeder or dropper and the other two on the outside of said blades, substantially as set forth.

In witness whereof I hereunto set my hand in presence of two witnesses.

BASIL B. PRITCHETT.

Witnesses:
J. E. PRITCHETT,
HENRY PARR.